(12) United States Patent
Huang et al.

(10) Patent No.: US 11,405,275 B2
(45) Date of Patent: Aug. 2, 2022

(54) AUTOMATICALLY DETERMINING MESH NETWORK ROLE OF NETWORK DEVICE

(71) Applicant: Hewlett Packard Enterprise Development LP, Houston, TX (US)

(72) Inventors: Kangchang Huang, Beijing (CN); Xiaoyang Fu, Beijing (CN); Xuefu Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/356,207

(22) Filed: Mar. 18, 2019

(65) Prior Publication Data
US 2019/0334772 A1  Oct. 31, 2019

(30) Foreign Application Priority Data

Apr. 27, 2018 (CN) .......................... 201810395879.2

(51) Int. Cl.
*H04L 41/0853* (2022.01)
*H04L 41/0823* (2022.01)
(Continued)

(52) U.S. Cl.
CPC ...... *H04L 41/0853* (2013.01); *H04L 41/0836* (2013.01); *H04L 41/12* (2013.01);
(Continued)

(58) Field of Classification Search
CPC ..... H04W 84/22; H04W 40/24; H04W 24/02; H04W 40/248; H04W 84/18; H04W 88/22; H04L 41/12; H04L 12/24; H04L 12/26; H04L 29/06; H04L 29/08; H04L 29/08072; H04L 41/22; H04L 41/0213; H04L 41/0823; H04L 41/0836; H04L 41/0853; H04L 43/0805; H04L 45/02; H04L 67/00; H04L 67/02; H04L 67/12; A61B 5/11;
(Continued)

(56) References Cited

U.S. PATENT DOCUMENTS 9,826,571 B2 * 11/2017 Iyer .................. H04W 84/22
10,750,433 B1 * 8/2020 Shukla ................ H04W 24/04
(Continued)

FOREIGN PATENT DOCUMENTS

CN 102858023 1/2013
CN 103141148 A 6/2013
(Continued)

OTHER PUBLICATIONS

WLAN Mesh Technology, (Research Paper), Retrieved Feb. 25, 2018, 13 Pgs.
(Continued)

*Primary Examiner* — Douglas B Blair
(74) *Attorney, Agent, or Firm* — Hewlett Packard Enterprise Patent Department

(57) ABSTRACT

An example device comprising: a processor to determine whether an uplink of the network device in a mesh network is operational, to determine whether a host is reachable through the uplink in response to the uplink being operational, and to periodically determine a mesh network role of the network device based on the determination of whether the host is reachable through the uplink.

18 Claims, 5 Drawing Sheets

(51) Int. Cl.
*H04L 41/12* (2022.01)
*H04L 43/0805* (2022.01)
*H04W 24/02* (2009.01)
*H04W 84/22* (2009.01)
*H04W 88/18* (2009.01)

(52) U.S. Cl.
CPC ......... *H04L 43/0805* (2013.01); *H04W 24/02* (2013.01); *H04W 84/22* (2013.01); *H04W 88/18* (2013.01)

(58) Field of Classification Search
CPC ... A61B 5/0022; A61B 5/7465; G06F 3/0481; G06F 13/00; G06F 19/00; G06F 19/327; G06F 19/3418; G16H 10/60; G16H 40/20; G16H 40/40; G16H 40/67
USPC .......................................................... 709/223
See application file for complete search history.

(56) References Cited

U.S. PATENT DOCUMENTS

| | | | |
|---|---|---|---|
| 2007/0025274 A1 | 2/2007 | Rahman et al. | |
| 2007/0206537 A1 | 9/2007 | Cam-Winget et al. | |
| 2009/0080333 A1* | 3/2009 | Ozer | H04W 84/22 370/237 |
| 2010/0071049 A1* | 3/2010 | Bahr | H04W 12/08 726/10 |
| 2010/0177755 A1* | 7/2010 | Chu | H04W 40/34 370/338 |
| 2011/0268013 A1* | 11/2011 | Levendel | H04W 40/248 370/315 |
| 2012/0014285 A1* | 1/2012 | Kalika | H04N 21/4126 370/254 |
| 2013/0003654 A1* | 1/2013 | Iyer | H04W 84/22 370/328 |
| 2014/0269652 A1* | 9/2014 | Buesker | H04L 12/2807 370/338 |
| 2015/0154364 A1* | 6/2015 | Biasi | G16H 40/67 709/223 |
| 2016/0073330 A1* | 3/2016 | Patil | H04W 88/04 709/220 |
| 2019/0045558 A1* | 2/2019 | Zhang | H04L 61/2092 |
| 2019/0158386 A1* | 5/2019 | Shanbhag | H04L 61/2015 |
| 2019/0313265 A1* | 10/2019 | Yamamoto | H04W 92/20 |

FOREIGN PATENT DOCUMENTS

| | | |
|---|---|---|
| CN | 105992262 | 10/2016 |
| CN | 107211369 A | 9/2017 |
| WO | 2011/060454 A2 | 5/2011 |
| WO | WO-2017128180 | 8/2017 |

OTHER PUBLICATIONS

European Search Report and Written Opinion received for EP Application No. 19152507.0, dated Apr. 9, 2019, 9 pages.

* cited by examiner ary devices by wire), the AP's mesh network role is assigned as a portal (that is, entrance device); otherwise, the AP's mesh network role is assigned as a point (that is, transit device).

AUTOMATICALLY DETERMINING MESH NETWORK ROLE OF NETWORK DEVICE

BACKGROUND

In wireless networks, there is a way to provide backhaul service for access points (APs) by creating mesh links between APs. As used herein, a mesh link may generally refer to a data link between a mesh point and its parent. A mesh link can be a wireless backhaul link. Before creating mesh links among APs, each AP may identify if it has any access to a wired network. That is, to the AP may determine its role in the mesh network (mesh network role for short). In a mesh network, the AP's mesh network role may be an entrance device (portal for short) or a transit device (point for short).

DETAILED DESCRIPTION

Figure 1:
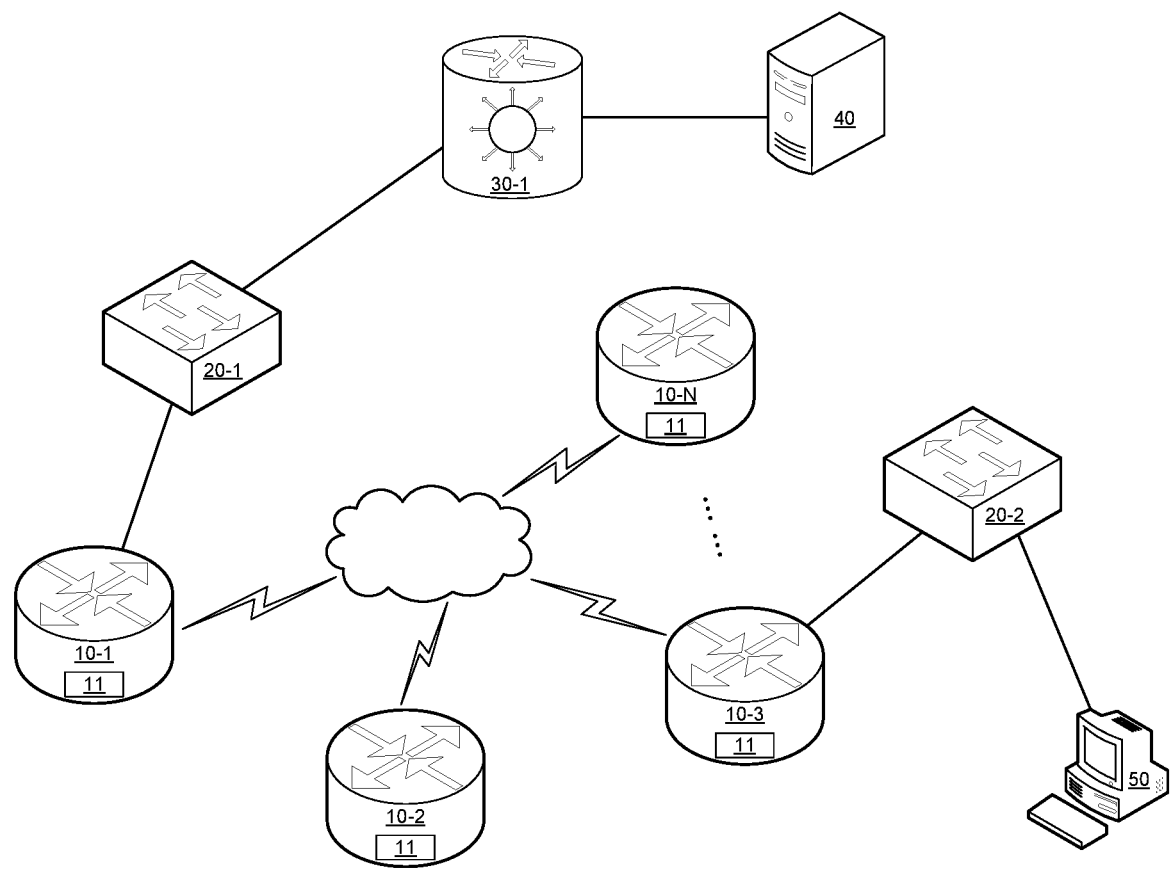
FIG. 1 is a block diagram illustrating an example mesh network including a network device capable of automatically determining mesh network role of network device according to the present disclosure.

In a mesh network, if an AP uses an Ethernet port to access the enterprise network through the wired access switch, the AP's mesh network role should be assigned as a portal (i.e., the entrance device); if an AP does not have wired access, it can only access the wired network by directly or indirectly wireless mesh links to other APs, the AP's mesh network role should be assigned as a point (i.e., the transit device), so that all APs can form a mesh network towards to the AP with wired access.

When determining mesh network role for an AP in a mesh network, the simplest method is to manually assign mesh network role to each AP during deployment. But this is not good, because user need to remember the assigned mesh network role of each AP. In addition, manually assigned mesh network role can't reflect changes in the mesh network role. For example, when an AP with a mesh network role designated as a portal loses its uplink access, the AP's mesh network role cannot be changed in time, which may make the entire wireless mesh network unable to work properly. As used herein, an uplink is a backhaul link that helps an AP to access a Enterprise network. The uplink can be both wired and wireless (e.g., 4G link).

Another method is to determine the AP's mesh network role through the physical state of the uplink device. For example, if the state of the AP's Ethernet port is physical up (that is, the Ethernet port is connected to other devices by wire), the AP's mesh network role is assigned as a portal (that is, entrance device); otherwise, the AP's mesh network role is assigned as a point (that is, transit device).

However, since this method depends on the physical state of the uplink device, it cannot correctly detect AP's mesh network role. For example, when an AP is connected to a switch by wire, and the switch is not connected to the gateway, the uplink state of the AP is physical up. Therefore, in this method, the AP's mesh network role may be assigned as a portal. However, since the switch to which the AP is connected is not connected to the gateway, the AP and the gateway cannot be connected by wire. So, the AP's mesh network role should be a point rather than a portal.

Another method is to determine the AP's mesh network role by checking the reachability of a specified host's IP address. If the specified host's IP address is reachable for an AP, the AP can directly connect to the specified host corresponding to the IP address by wire, that is, the specified host is reachable. Therefore, the AP's mesh network role is a portal. If the IP address is unreachable (that is, the specified host is unreachable), the AP's mesh network role is a point.

However, this method cannot detect the dynamic change of the AP's mesh network role. For example, when the switch connected to an AP is not connected to the gateway and the specified host is unreachable for the AP, the AP's mesh network role is assigned as a point. After that, even if the user connects the switch to the gateway so that the specified host is reachable for the AP, the AP may still work as a point until the AP is restarted next time.

Accordingly, in the examples herein, the mesh network role of the network device may be periodically determined based on whether the high priority uplink of the network device is physical up and the specified host is reachable through the high priority uplink. Wherein, the high priority uplink is the backhaul link that has higher priority than mesh link. For example, the high priority uplink may be an Ethernet port. Wherein, the specified host may be an AP controller or other controller or other server.

Since the network device's mesh network role can be detected by combining host reachability and gateway reachability, each network device in the mesh network can automatically and periodically detect whether its mesh network role is a portal or a point, and can also detect the dynamic changes of its mesh network role.

In one example, a device comprises a processor to determine whether an uplink of the network device in a mesh network is operational, to determine whether a host is reachable through the uplink in response to the uplink being operational, and to periodically determine a mesh network role of the network device based on the determination of whether the host is reachable through the uplink.

In another example, a method comprising determining, by a processor of a network device, whether an uplink of the network device in a mesh network is operational; determining, by the processor, whether a host is reachable through the uplink in response to the uplink being operational; and periodically determining, by the processor, a mesh network role of the network device based on the determination of whether the host is reachable through the uplink.

In another example, a non-transitory computer readable storage medium storing instructions that, when executed by a processor of a network device, causes the processor to determine whether an uplink of the network device in a mesh network is operational, to determine whether a host is reachable through the uplink in response to the uplink being operational, and to periodically determine a mesh network role of the network device based on the determination of whether the host is reachable through the uplink.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for automatically determining mesh network role of network device.

It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example mesh network including a network device capable of automatically determining mesh network role of network device according to the present disclosure. Referring to FIG. 1, a mesh network may include a plurality of network devices (e.g., 10-1 to 10-N) and at least one switch (e.g., 20-1 and 20-2). The network device may use an Ethernet port to access a switch by wire, or may connect to other network devices through a wireless link in a mesh network (i.e., the mesh link). The network device may be an AP or any other device capable of transmitting wireless signals to and receiving wireless signals from client devices.

For example, as shown in FIG. 1, the network device is an AP. The AP 10-1 uses an Ethernet port to access a switch 20-1 by wire, the AP 10-2 connects to other APs through the wireless link in the mesh network, and the AP 10-3 uses an Ethernet port to access a switch 20-2 by wire. In addition, the switch can be wired to access a gateway, and can also be wired to connect to a non-gateway device. For example, the switch 20-1 is connected to the gateway 30-1 by wire, and the gateway 30-1 is connected to a host 40. The switch 20-2 is connected to a non-gateway device 50 by wire.

Each network device may include a processor 11. The processor 11 may periodically determine the mesh network role of the network device based on whether the high priority uplink of the network device is physical up and the specified host is reachable through the high priority uplink.

For example, if a high priority uplink of a network device is physical up, and the specified host is reachable through the high priority uplink, the mesh device role of the network device may be assigned as a portal; otherwise, the mesh device role of the network device may be assigned as a point.

For example, as shown in FIG. 1, in the mesh network, since the AP 10-1 uses a high priority uplink (e.g., an Ethernet port) to access the switch 20-1 by wire (that is, the high priority uplink of the AP 10-1 is physical up), and can be wired to the host 40 through the switch 20-1 and the gateway 30-1, the host 40 is reachable either through the high priority uplink and/or the mesh link for the AP 10-1, and the gateway 30-1 is also reachable through the high priority uplink for the AP 10-1. So, the mesh network role of the AP 10-1 should be a portal.

For another example, as shown in FIG. 1, since the AP 10-2 is not directly wired to the switch (that is, the high priority uplink of the AP 10-2 is physical down), but is connected to other APs (e.g., the AP 10-1) through a wireless mesh link, and indirectly connect to the wired network through the other AP, the AP 10-2 cannot be directly connected to the gateway (e.g., the gateway 30-1) and the specified host (e.g., the host 40) by wire. That is, the specified host is unreachable through the high priority uplink for AP 10-2. Therefore, the mesh network role of the AP 10-2 should be a point.

For another example, as shown in FIG. 1, although the AP 10-3 is connected to the switch 20-2 by wire (that is, the high priority uplink of the AP 10-3 is physical up), the switch 20-2 is not connected to the gateway 30-1 by wire. Therefore, the AP 10-3 cannot be directly connected to the gateway (e.g., the gateway 30-1) and the specified host (e.g., the host 40) by wire. That is, the specified host is unreachable through the high priority uplink for AP 10-3. Therefore, the mesh network role of the AP 10-3 should also be a point.

Figure 2:
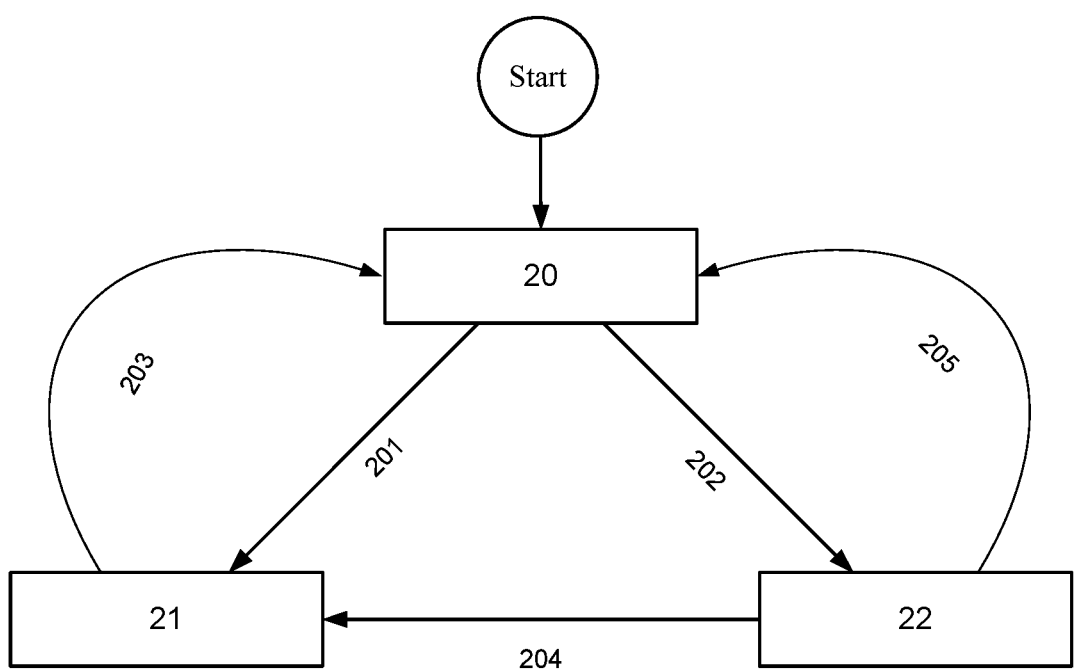
FIG. 2 is a diagram illustrating an example state machine of network device according to present disclosure.

FIG. 2 is a diagram illustrating an example state machine of network device according to present disclosure. Referring to FIG. 2, in one example, the network device may have three states; initial state (STATE_INIT) 20, portal state (STATE_PORTAL) 21, and point state (STATE_POINT) 22.

When the network device is started or restarted for the first time, the network device may be in the initial state 20.

In one example, when the network device is in the initial state 20, if a high priority uplink of the network device is physical up and the specified host is reachable through the high priority uplink, the network device may be transformed from the initial state 20 to the portal state 21 (as shown in FIG. 2, 201), the mesh network role of the network device is a portal; otherwise, the network device may be transformed from the initial state 20 to the point state 22 (as shown in FIG. 2, 202), and the mesh network role of the network device is a point.

For example, when the network device is in the initial state, the network device may first check whether its high priority uplink is physical up. If the high priority uplink is physical down, the network device may be transformed from the initial state to the point state and operate as a transit device. If the high priority uplink is physical up, the network device may start Dynamic Host Configuration Protocol (DHCP) on the high priority uplink to obtain its own IP address and gateway's IP address. After obtaining its own IP address and gateway's IP address, the network device may start sending reachability check frames to the specified host through the high priority uplink. If the network device obtains a reply message corresponding to the reachability check frame from the specified host, the network device may be determined as a portal and may be transformed from the initial state to the portal state; otherwise, the network device may be determined as a point and may be transformed from the initial state to the point state.

For example, as shown in FIG. 1, the Ethernet port (i.e., the high priority uplink) of the AP 10-2 is physical down (i.e., not directly wired to the switch), so the mesh network role of the AP 10-2 may be determined as a point, and the AP 10-2 may be transformed from the initial state to the point state.

The Ethernet port (i.e., the high priority uplink) of the AP 10-1 is physical up (i.e., connected to switch 20-1 by wire). Therefore, after obtaining the IP address of the specified host 40 through the Ethernet port, the AP 10-1 may find that the specified host 40 is reachable for the AP 10-1 by sending reachability check frames to the specified host 40. So, the mesh network role of the AP 10-1 may be determined as a portal, and the AP 10-1 may be transformed from the initial state to the portal state.

The Ethernet port (i.e., the high priority uplink) of AP 10-3 is physical up (i.e., connected to switch 20-2 by wire), but switch 20-2 is not connected to the gateway. Therefore, AP 10-3 cannot obtain the IP address of the specified host 40 through DHCP on the Ethernet port. So, the mesh network role of the AP 10-2 may be determined as a point, and the AP 10-2 may be transformed from the initial state to the point state.

In another example, when the network device is in the portal state, the mesh network role of the network device has been determined as a portal. At this point, the network device may continue to determine whether it should be transformed from the portal state to another state by detecting whether the specified host is still reachable. Therefore, the network device may periodically send reachability check frames to the specified host through the high priority uplink. After sending a plurality of reachability check frames to the specified host, if there are reachability replies from the specified host that correspond to consecutive multiple (i.e., continuous 2 or 3) reachability check frames are not received, the network device may be transformed from the portal state 21 to the initial state 20 (as shown in FIG. 2, 203) to re-determine the mesh network role of the network device.

In another example, when the network device is in the point state 22, the mesh network role of the network device has been determined as a point. At this point, the network device may continue to determine whether it should be transformed from the point state to another state by detecting whether the specified host may become reachable through the high priority uplink. Therefore, the network device may periodically send reachability check frames to the specified host through the mesh link, and periodically send the Address Resolution Protocol (ARP) requests and the DHCP discovery frames to the high priority uplink to determine if the gateway is reachable through the high priority uplink. If the specified host is reachable through the mesh link and the gateway is reachable through the high priority uplink, the network device may be transformed from the point state 22 to the portal state 21 (as shown in FIG. 2, 204), and the network device may be determined as a portal.

For example, as shown in FIG. 1, when the mesh network role of the AP 10-3 is determined as a point, the state of the AP 10-3 is in the point state. After creating a mesh link, the AP 10-3 may use DHCP to obtain an IP address and simultaneously obtain the IP address of a known gateway (e.g., the gateway 30-1).

Since the high priority uplink (e.g., Ethernet port) of the AP 10-3 is physical up (i.e., connected to switch 20-2 by wire), the AP 10-3 may periodically send reachability check frames to a known designated host (e.g., the host 40) through the mesh link, and periodically send the ARP requests and the DHCP discovery frames to the high priority uplink. Then, the AP 10-3 may detect the possibility of its mesh network role change by collecting the following frames: the reachability reply of the specified host over the mesh link, the ARP reply of current gateway over the high priority uplink, and the DHCP OFFER frames of any host over the high priority uplink.

Figure 3:
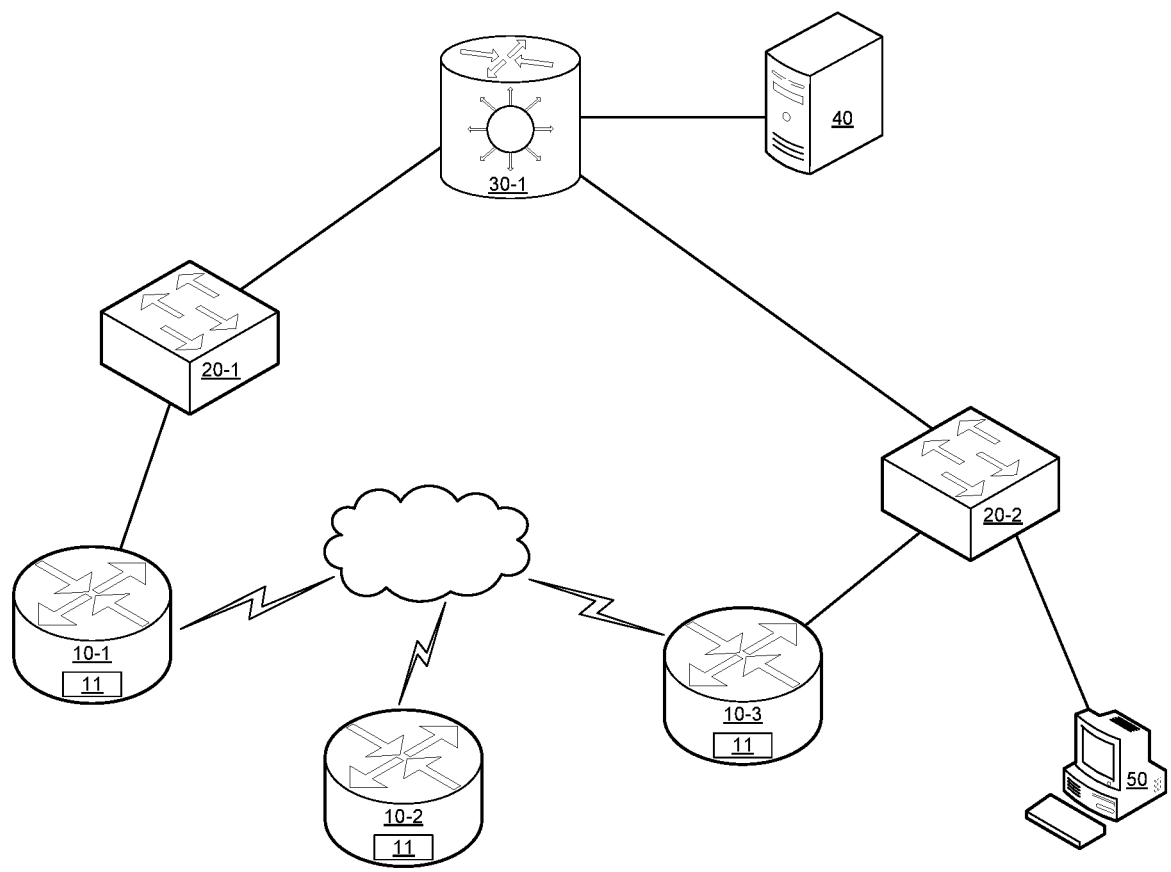
FIG. 3 is a block diagram illustrating another example mesh network including a network device capable of automatically determining mesh network role of network device according to the present disclosure.

For example, as shown in FIG. 3, compared to FIG. 1, the mesh network in FIG. 3 includes three network devices (10-1, 10-2, and 10-3) and two switches (20-1 and 20-2). When a network administrator connects the switch 20-2 to the gateway 30-1, by collecting the ARP reply of the Ethernet port, the AP 10-3 may find that the gateway 30-1 is reachable through the Ethernet port. Since the specified host 40 can be reached through the mesh link and the gateway 30-1, the AP 10-3 may send reachability check frames to the specified host 40 through mesh link. If AP 10-3 receives reachability replies from the specified host 40, the specified host 40 is reachable through the mesh link and the gateway 30-1 is reachable through the Ethernet port for the AP 10-3. Therefore, the mesh network role of the AP 10-3 may be determined as a portal, and the AP 10-3 may be transformed from the point state to the portal state.

Figure 4:
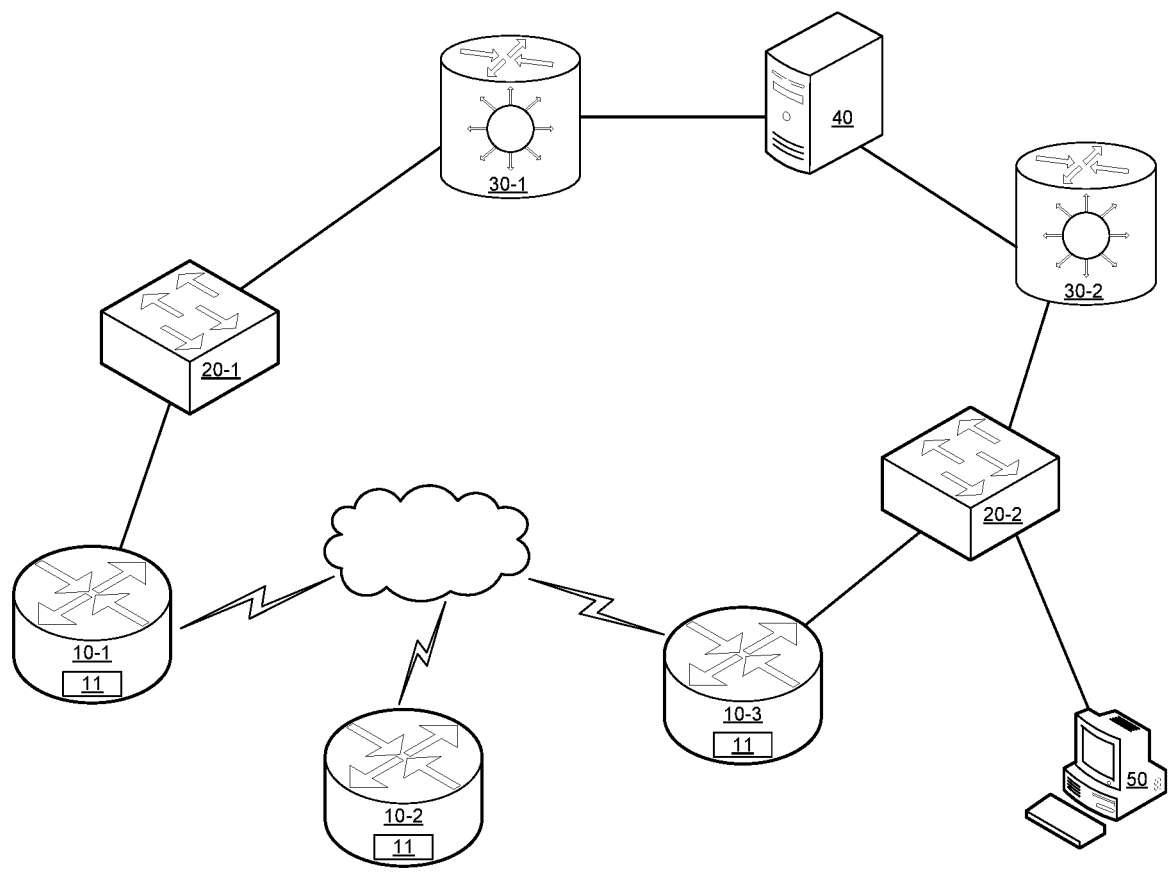
FIG. 4 is a block diagram illustrating another example mesh network including a network device capable of automatically determining mesh network role of network device according to the present disclosure.

For another example, as shown in FIG. 4, compared to FIG. 1, the mesh network in FIG. 4 includes three network devices (10-1, 10-2, and 10-3) and two switches (20-1 and 20-2). When a network administrator connects the switch 20-2 to a new gateway 30-2, and the gateway 30-2 is connected to the specified host 40, by collecting the DHCP OFFER frames, the AP 10-3 may find that the new gateway 30-2 is reachable through the Ethernet port. At this time, the AP 10-3 may obtain an additional IP address (i.e., the IP address managed by the new gateway 30-2) by sending DHCP request through the Ethernet port, and send reachability check frames to the specified host 40 through mesh link. If the AP 10-3 receives reachability replies from the specified host 40, the specified host 40 is reachable through the mesh link and the gateway 30-2 is reachable through the Ethernet port for the AP 10-3. Therefore, the mesh network role of the AP 10-3 may be determined as a portal, and the AP 10-3 may be transformed from the point state to the portal state.

In addition, in another example, when the AP 10-3 finds that a new gateway 30-2 is reachable through the Ethernet port, the AP 10-3 may also be transformed from the point state to the initial state to re-determine the mesh network role of the AP 10-3.

Figure 5:
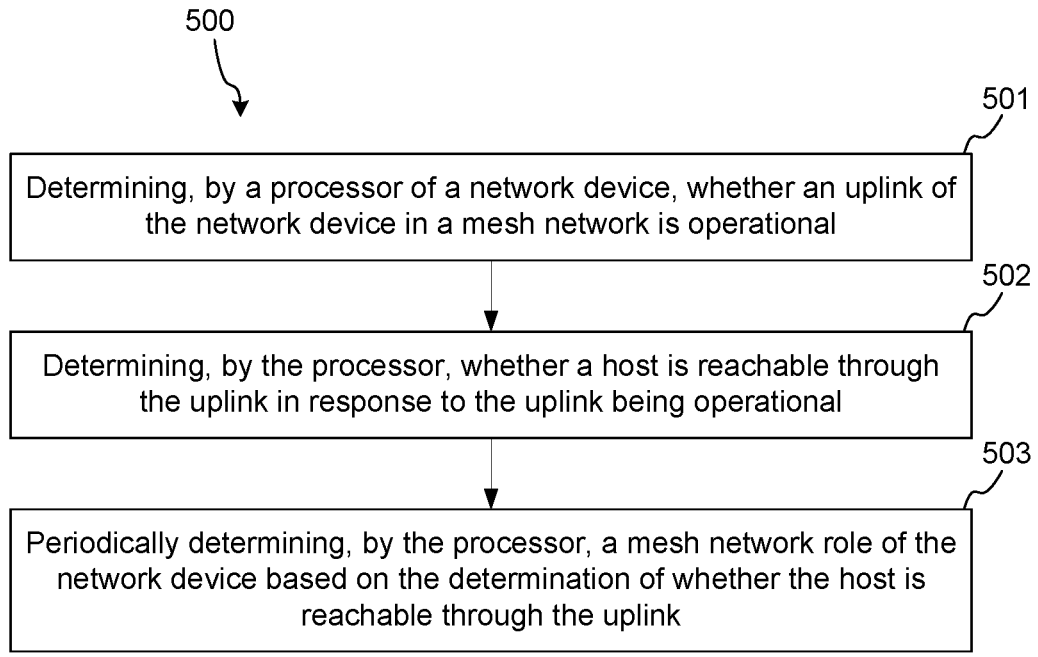
FIG. 5 is a flow chart illustrating an example method for automatically determining mesh network role of network device according to present disclosure.

FIG. 5 is a flow chart illustrating an example method for automatically determining mesh network role of network device according to present disclosure.

Referring to FIG. 5: A method 500 comprises: determining, by a processor of a network device, whether an uplink of the network device in a mesh network is operational, at 501.

The method 500 further comprises determining, by the processor, whether a host is reachable through the uplink in response to the uplink being operational, at 502.

The method 500 further comprises periodically determining, by the processor, a mesh network role of the network device based on the determination of whether the host is reachable through the uplink, at 503.

In one example, the mesh network role of the network device may be assigned to a portal in response to the uplink of the network device being operational, and the host being reachable through the uplink; and the mesh network role of the network device may be assigned to a point in response to the uplink of the network device being non-operational through the uplink or the host not being reachable through the uplink.

In another example, the network device may comprise a state machine, and wherein the state machine may comprise an initial state, a portal state, and a point state.

In another example, in response to (1) the state machine being in the initial state, (2) the uplink of the network device being operational, and (3) the host being reachable through the uplink, the state machine transitions from the initial state to the portal state, and assigning, by the processor, the mesh network role of the network device to a portal; wherein in response to (1) the state machine not being in the initial state, (2) the uplink of the network device being non-operational, or (3) the host being unreachable through the uplink, the state machine transitions from the initial state to the point state, and assigning, by the processor, the mesh network role of the network device to a point.

In another example, wherein in response to the state machine being in the portal state, periodically sending, by the processor, a plurality of frames to the host through the uplink to check reachability of the host; and in response to not receiving replies from the host that correspond to the plurality of frames, transition the state machine from the portal state to the initial state and determining, by the processor, a new mesh network role of the network device.

In another example, wherein in response to the state machine being in the point state, periodically sending, by the processor, a plurality of frames to the host through a mesh link to check reachability of the host, and periodically sending, by the processor, a plurality of frames through the uplink to check reachability of a gateway; and in response to the host being reachable through the mesh link and the gateway being reachable through the uplink, transition the state machine from the point state to the portal state and assigning, by the processor, the mesh network role of the network device to a portal.

Figure 6:
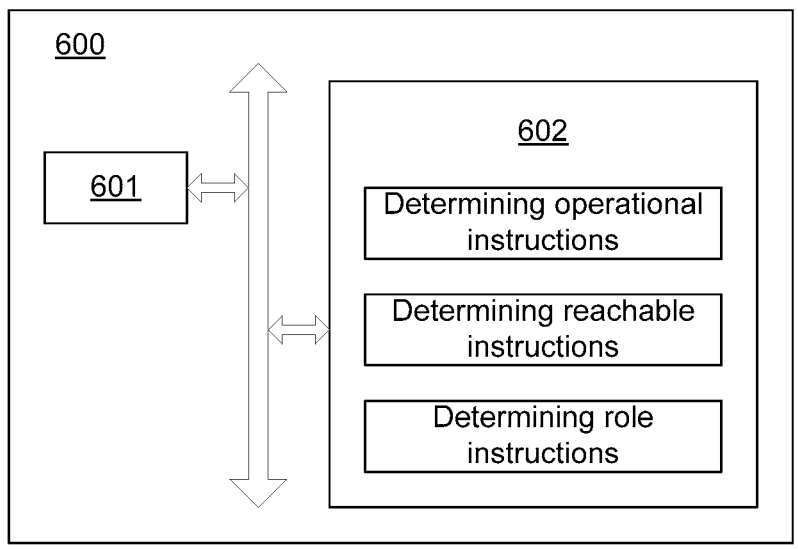
FIG. 6 is a schematic illustrating example components for implementing the device shown in FIG. 1 according to present disclosure.

FIG. 6 is a schematic illustrating example components for implementing the device shown in FIG. 1 according to present disclosure.

Referring to FIG. 6, the device 600 includes a processor 601 and and/or a non-transitory computer readable storage medium 602.

The non-transitory computer readable storage medium 602 stores instructions executable for the possessor 601.

The instructions include determining operational instructions that, when executed by the processor 601, cause the processor 601 to determine whether an uplink of the network device in a mesh network is operational.

The instructions include determining reachable instructions that, when executed by the processor 601, cause the processor 601 to determine whether a host is reachable through the uplink in response to the uplink being operational The instructions include determining role instructions that, when executed by the processor 601, cause the processor 601 to periodically determine a mesh network role of the network device based on the determination of whether the host is reachable through the uplink.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A network device comprising:
a processor; and
a memory unit including instructions that when executed, cause the processor to:
determine whether an uplink of the network device in a mesh network is operational, the uplink comprising a backhaul link used by the network device to access an enterprise network;
initially determine whether a host is reachable through the uplink in response to the uplink being operational;
in response to the uplink of the network device being operational, and the host being reachable through the uplink, assign the mesh network role of the network device to a portal;
in response to the uplink of the network device being non-operational through the uplink or the host not being reachable through the uplink, assign the mesh network role of the network device to a point; and
update the assigned mesh network role of the network device based on subsequent periodic determinations of whether the host is reachable through the uplink.

2. The network device of claim 1, wherein the network device comprises a state machine, and wherein the state machine comprises an initial state, a portal state, and a point state.

3. The network device of claim 2, wherein in response to (1) the state machine being in the initial state, (2) the uplink of the network device being operational, and (3) the host being reachable through the uplink, the state machine transitions from the initial state to the portal state, and the processor assigns the mesh network role of the network device to a portal;
wherein in response to (1) the state machine not being in the initial state, (2) the uplink of the network device being non-operational, or (3) the host being unreachable through the uplink, the state machine transitions from the initial state to the point state, and the processor assigns the mesh network role of the network device to a point.

4. The network device of claim 2, wherein in response to the state machine being in the portal state, the processor periodically sends a plurality of frames to the host through the uplink to check reachability of the host; and in response to not receiving replies from the host that correspond to the plurality of frames, transition the state machine from the portal state to the initial state and determine a new mesh network role of the network device.

5. The network device of claim 2, wherein in response to the state machine being in the point state, the processor periodically sends a plurality of frames to the host through a mesh link to check reachability of the host, and periodically sends a plurality of frames through the uplink to check reachability of a gateway; and in response to the host being reachable through the mesh link and the gateway being reachable through the uplink, transition the state machine from the point state to the portal state and the processor assigns the mesh network role of the network device to a portal.

6. The network device of claim 1, wherein the uplink has a higher priority that than of a mesh link of the mesh network, and wherein the host is alternatively reachable through the mesh link.

7. A method comprising:
   determining, by a processor of a network device, whether an uplink of the network device in a mesh network is operational, the uplink comprising a backhaul link used by the network device to access an enterprise network;
   determining, by the processor, whether a host is reachable through the uplink in response to the uplink being operational;
   assigning, by the processor, the mesh network role of the network device to a portal in response to the uplink of the network device being operational, and the host being reachable through the uplink;
   assigning, by the processor, the mesh network role of the network device to a point in response to the uplink of the network device being non-operational through the uplink or the host not being reachable through the uplink; and
   updating, by the processor, the assigned mesh network role of the network device based on subsequent periodic determinations of whether the host is reachable through the uplink.

8. The method of claim 7, wherein the network device comprises a state machine, and wherein the state machine comprises an initial state, a portal state, and a point state.

9. The method of claim 8, wherein in response to (1) the state machine being in the initial state, (2) the uplink of the network device being operational, and (3) the host being reachable through the uplink, the state machine transitions from the initial state to the portal state, and assigning, by the processor, the mesh network role of the network device to a portal;
   wherein in response to (1) the state machine not being in the initial state, (2) the uplink of the network device being non-operational, or (3) the host being unreachable through the uplink, the state machine transitions from the initial state to the point state, and assigning, by the processor, the mesh network role of the network device to a point.

10. The method of claim 8, wherein in response to the state machine being in the portal state, periodically sending, by the processor, a plurality of frames to the host through the uplink to check reachability of the host; and in response to not receiving replies from the host that correspond to the plurality of frames, transition the state machine from the portal state to the initial state and determining, by the processor, a new mesh network role of the network device.

11. The method of claim 8, wherein in response to the state machine being in the point state, periodically sending, by the processor, a plurality of frames to the host through a mesh link to check reachability of the host, and periodically sending, by the processor, a plurality of frames through the uplink to check reachability of a gateway; and in response to the host being reachable through the mesh link and the gateway being reachable through the uplink, transition the state machine from the point state to the portal state and assigning, by the processor, the mesh network role of the network device to a portal.

12. The method of claim 7, wherein the uplink has a higher priority that than of a mesh link of the mesh network, and wherein the host is alternatively reachable through the mesh link.

13. The method of claim 7, wherein the uplink has a higher priority that than of a mesh link of the mesh network, and wherein the host is alternatively reachable through the mesh link.

14. A non-transitory computer readable storage medium storing instructions that, when executed by a processor of a network device, causes the processor to:
   determine whether an uplink of the network device in a mesh network is operational, the uplink comprising a backhaul link used by the network device to access an enterprise network;
   determine whether a host is reachable through the uplink in response to the uplink being operational;
   in response to the uplink of the network device being operational, and the host being reachable through the uplink, assign the mesh network role of the network device to a portal;
   in response to the uplink of the network device being non-operational through the uplink or the host not being reachable through the uplink, assign the mesh network role of the network device to a point; and
   update the assigned mesh network role of the network device based on subsequent periodic determinations of whether the host is reachable through the uplink.

15. The non-transitory computer readable storage medium of claim 14, wherein the network device comprises a state machine, and wherein the state machine comprises an initial state, a portal state, and a point state.

16. The non-transitory computer readable storage medium of claim 15, storing further instructions that when executed by the processor, cause the processor to: in response to (1) the state machine being in the initial state, (2) the uplink of the network device being operational, and (3) the host being reachable through the uplink, transition the state machine from the initial state to the portal state, and assign the mesh network role of the network device to a portal; and
   in response to (1) the state machine not being in the initial state, (2) the uplink of the network device being non-operational, or (3) the host being unreachable through the uplink, transition the state machine from the initial state to the point state, and assign the mesh network role of the network device to a point.

17. The non-transitory computer readable storage medium of claim 15, storing further instructions that when executed by the processor, cause the processor to: in response to the state machine being in the portal state, periodically send a plurality of frames to the host through the uplink to check reachability of the host; and in response to not receiving replies from the host that correspond to the plurality of frames, transition the state machine from the portal state to the initial state and determine a new mesh network role of the network device.

18. The non-transitory computer readable storage medium of claim 15, storing further instructions that when executed by the processor, cause the processor to: in response to the state machine being in the point state, periodically send a plurality of frames to the host through a mesh link to check reachability of the host, and periodically send a plurality of frames through the uplink to check reachability of a gateway; and in response to the host being reachable through the mesh link and the gateway being reachable through the uplink, transition the state machine from the point state to the portal state and assign the mesh network role of the network device to a portal.

* * * * *